Figure 1:
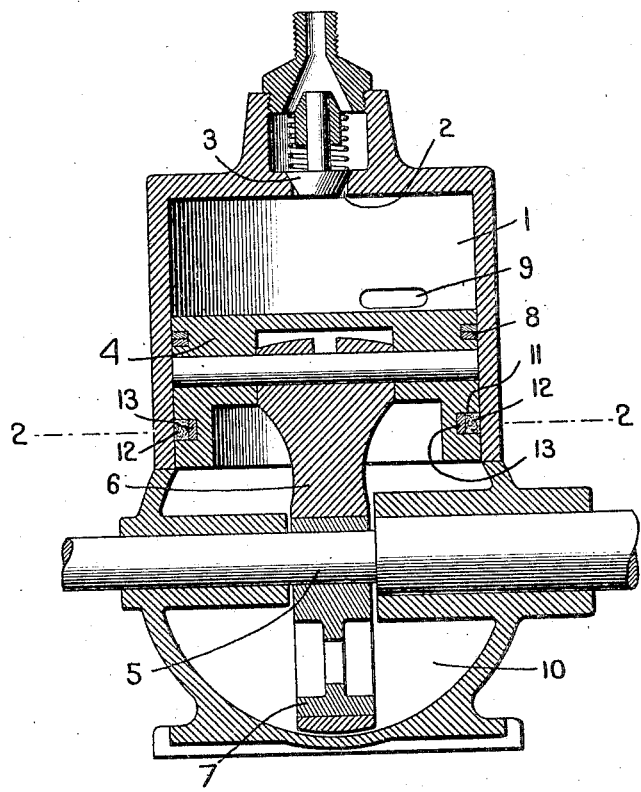

Aug. 7, 1923.

C. A. SLEICHER

PUMP

Filed March 10, 1917

1,464,223

Inventor.
Charles A. Sleicher
by Heard Smith & Tennant
Attys.

Patented Aug. 7, 1923.

1,464,223

UNITED STATES PATENT OFFICE.

CHARLES A. SLEICHER, OF TROY, NEW YORK, ASSIGNOR, BY MESNE ASSIGNMENTS, TO TROY FOUNDRY AND MACHINE CO. INC., OF TROY, NEW YORK, A CORPORATION OF MASSACHUSETTS.

PUMP.

Application filed March 10, 1917. Serial No. 153,964.

*To all whom it may concern:*

Be it known that I, CHARLES A. SLEICHER, a citizen of the United States, residing at Troy, county of Rensselaer, State of New York, have invented an Improvement in Pumps, of which the following description, in connection with the accompanying drawing, is a specification, like characters on the drawing representing like parts.

This invention relates to pumps and particularly to air pumps adapted for pumping up automobile tires. Pumps which are used for pumping up automobile tires are frequently required to develop pressures of from seventy to one hundred and fifty pounds, and this, of course, necessitates pistons which tightly fit the cylinders. In order that such pumps may be used successfully, it is important that the piston should be kept lubricated. It is also important that the construction should be such as to prevent any oil from working by the piston into the compression end of the cylinder because the presence of oil in the air which is forced into a pneumatic tire will have a deleterious effect upon the rubber of the tire.

The object of my invention is to provide a novel pump which is so constructed as to provide the necessary tight joint between the piston and cylinder and which is also constructed so as to provide the necessary lubrication of the piston without permitting any oil from working past the piston into the compression end of the cylinder.

In order to give an understanding of my invention, I have illustrated in the drawings a selected embodiment thereof which will now be described, after which the novel features will be pointed out in the appended claim.

Figure 2:
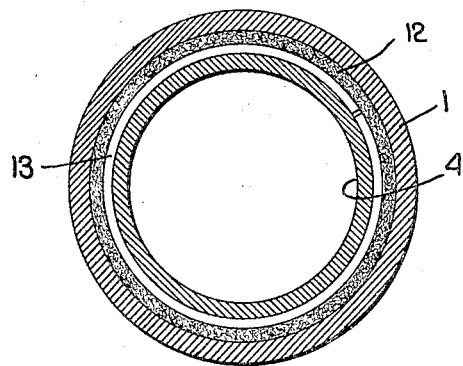

In the drawings, Fig. 1 is a vertical sectional view through a pump embodying my invention;

Fig. 2 is a section on the line 2—2, Fig. 1.

The pump herein shown comprises the cylinder 1 having an inlet port 9 and also provided in its head or end with an outlet port 2 controlled by a spring-pressed check valve 3. Operating in the cylinder is the piston 4 which is connected to a driving shaft 5 by a suitable connecting rod 6. The connecting rod is shown as connected to an eccentric 7 carried by the driving shaft 5. In order to make a tight joint between the piston and cylinder, I employ the usual piston rings 8.

The pump is also provided with a closed crank casing 10 which is adapted to contain oil so that as the pump is operated the eccentric and eccentric strap will dip into the oil and thus throw the oil against the underside of the piston and the exposed portions of the walls of the cylinder. This will keep the parts properly lubricated.

In order to prevent the oil from working by the piston, I provide an annular groove 11 in the lower end of the piston and then I place in said groove a packing-ring 12 of felt, which packing ring engages the walls of the cylinder. I will also preferably place a split ring 13 in the bottom of the groove 11 and inside of the felt packing ring 12, the split ring being in the nature of a spring ring which tends to force the felt packing outwardly into contact with the walls of the cylinder. The felt packing ring 12 has absorbent qualities and the spring ring 13 is constructed to hold the packing ring 12 against the walls of the cylinder with sufficient pressure to prevent any excess oil working by the packing 12. This pressure, however, is not sufficient to eliminate entirely the absorptive properties of the packing ring 12 so that the latter will absorb a certain amount of oil. The pressure of the packing ring against the cylinder is sufficient so that during the down stroke of the piston said ring will scrape excess oil from the cylinder walls and the absorbent quality of the packing ring will assist this operation so that no excess oil can work by the piston.

I claim:

In an air pump, the combination with a crank casing containing oil, of a single-acting cylinder mounted on and having one end communicating with the crank case, a piston in the cylinder, a crank shaft journalled in the crank case and connected to the piston, said piston being provided near its working end with a plurality of piston rings to make a tight joint with the cylinder walls and to prevent the material being pumped from leaking past the piston during the compressing stroke, said piston also having means to prevent excess oil from working past the piston during the suction stroke and a compressing annular peripheral groove in said piston adjacent its end which faces the crank case, a ring of felt or absorbent material situated in said groove and a split resilient ring in the bottom of the groove behind said felt ring and tending to expand the felt ring outwardly into contact with the walls of the cylinder with sufficient pressure to prevent excess oil from working past the piston.

In testimony whereof, I have signed my name to this specification.

CHARLES A. SLEICHER.